(12) United States Patent
Aponte Luis

(10) Patent No.: US 11,428,563 B2
(45) Date of Patent: Aug. 30, 2022

(54) FLOOD SENSOR FOR AUTOMIZATION SYSTEMS

(71) Applicant: ONTECH SECURITY, SL, Seville (ES)

(72) Inventor: Juan Aponte Luis, Seville (ES)

(73) Assignee: ONTECH SECURITY, SL, Seville (ES)

( * ) Notice: Subject to any disclaimer, the term of this patent is extended or adjusted under 35 U.S.C. 154(b) by 0 days.

(21) Appl. No.: 17/417,105

(22) PCT Filed: Nov. 7, 2019

(86) PCT No.: PCT/ES2019/070760
§ 371 (c)(1),
(2) Date: Jun. 21, 2021

(87) PCT Pub. No.: WO2020/094904
PCT Pub. Date: May 14, 2020

(65) Prior Publication Data
US 2022/0074780 A1    Mar. 10, 2022

(30) Foreign Application Priority Data
Nov. 7, 2018 (EP) ..................................... 18382791

(51) Int. Cl.
*G01F 23/00* (2022.01)
*G01F 23/24* (2006.01)
(Continued)

(52) U.S. Cl.
CPC ............. *G01F 23/243* (2013.01); *G01M 3/18* (2013.01); *G08B 21/20* (2013.01); *G08B 25/10* (2013.01)

(58) Field of Classification Search
CPC .......... G08B 21/20; G08B 25/10; G01M 3/18
See application file for complete search history.

(56) References Cited

U.S. PATENT DOCUMENTS

| 5,507,178 A | 4/1996 | Dam |
| 11,079,347 B1* | 8/2021 | Beasley ................ G01M 3/186 |

(Continued)

FOREIGN PATENT DOCUMENTS

EP     3 264 383 A1     1/2018

OTHER PUBLICATIONS

International Search Report, dated Dec. 11, 2019 for corresponding International Application No. PCT/ES2019/070760 with English translation (5 pages).

(Continued)

*Primary Examiner* — Ojiako K Nwugo
(74) *Attorney, Agent, or Firm* — Intellectual Property Law Group LLP

(57) ABSTRACT

A flood sensor for automation systems comprising at least two electrodes connected with a measuring circuit arranged to detect a plurality of liquid levels; and wherein the measuring circuit has a zero static current consumption, having current flow only in the presence of fluid; and wherein if a liquid is detected, the output of the circuit is activated and a microcontroller leaves a zero-power state in which it normally stays; and wherein the microcontroller comprises a program or programs stored in a memory and configured for being run by means of the microcontroller, wherein said programs comprise instructions for: (a) measuring the impedance of the liquid that has activated the output of the measuring circuit; and (b) sending the measured impedance to a central control.

6 Claims, 4 Drawing Sheets

(51) Int. Cl.
*G01M 3/18* (2006.01)
*G08B 21/20* (2006.01)
*G08B 25/10* (2006.01)

(56) References Cited

U.S. PATENT DOCUMENTS

| | | | |
|---|---|---|---|
| 2002/0096213 A1 | 7/2002 | Jacobsen et al. | |
| 2015/0091723 A1 | 4/2015 | Fledler et al. | |
| 2016/0123834 A1* | 5/2016 | Vilbrandt | G01M 3/18 |
| | | | 324/693 |
| 2017/0299210 A1 | 10/2017 | Nyamjav et al. | |
| 2019/0027013 A1* | 1/2019 | Sale | G08B 21/20 |
| 2019/0070043 A1* | 3/2019 | Collette | A61F 13/42 |
| 2019/0168036 A1* | 6/2019 | Conboy | A62C 3/0242 |
| 2020/0098967 A1* | 3/2020 | Chaput | H03K 17/964 |
| 2020/0259298 A1* | 8/2020 | Tyrrell | H01R 13/6683 |
| 2021/0140844 A1* | 5/2021 | Jung | G08B 29/185 |

OTHER PUBLICATIONS

Written Opinion of the ISA, dated Dec. 11, 2019 for corresponding International Application No. PCT/ES2019/070760 (7 pages).

* cited by examiner

FLOOD SENSOR FOR AUTOMIZATION SYSTEMS

CROSS-REFERENCE TO RELATED APPLICATIONS

This application is a U.S. National Phase application, under 35 U.S.C. § 371, of International Application no. PCT/ES2019/070760, with an international filing date of Nov. 7, 2019, and claims benefit of European Application no. 18382791.4 filed on Nov. 7, 2018, each of which are hereby incorporated by reference for all purposes.

FIELD OF THE INVENTION

The present invention relates to a flood sensor for smart automation systems. The device of the invention is a low cost and low power consumption system that makes possible an easy integration of sensor nodes into smart automation systems. The user can have remote access to the sensor information through communication networks such as the Internet or mobile networks.

BACKGROUND OF THE INVENTION

In the last years, many of the new smart home systems have added water leak detectors to their roster of connected devices (e.g. US2017299210A1). These sensors can be placed near appliances, such as washing machines, dishwashers or water heaters, or they can be mounted in basements, kitchens, bathrooms, toilets or garages to prevent burst pipe disasters. The importance of early detection is crucial to avoid these situations.

Most smart home water sensors are battery powered and include some variety of low power wireless technology. Wireless communication technologies have advanced rapidly and the use of wireless sensor networks (WSN) has extended to many applications, such as home automation, environmental monitoring, health monitoring among others. WSN eliminates the need of wired sensor nodes across the home and reduces installation and maintenance costs. The IEEE 802.15.4 standard is particularly suited for the implementation of low cost, low power consumption, reliable control and real-time monitoring application within the smart home framework. Efficient power management is a major concern in wireless sensor nodes.

The implementation of the wireless device implies the integration of different subjects, such as electronics, computer science and communication systems. The system collects information from sensors, processes the information and activate outputs.

Generally, domestic flood detectors are based on the change in conductivity between at least two pins of an electronic system. An example of such systems is the one described in patent document US2015091723 which relates to different methods and systems for a flood and temperature sensor which can comprise detecting the presence of water in a premise by means of measuring a resistance between at least one pair of metal probes in a flood sensor, detecting a temperature, and detecting an orientation of the sensor with respect to gravity using one or more level sensors. The metal probes may be extendable. The metal probes may be gold-plated. The presence of water can be detected using a remote probe. The sensor may communicate wirelessly with one or more external devices using a wireless transceiver.

Nevertheless, until now, there were two significant drawbacks for deploying smart sensors along isolated areas: the cost of the components and the battery lifetime. They required periodical sensor supervision for node status check and battery replacement. Consequently, it is needed an integrated solution that allows long periods between maintenance and replacement visits. For this purpose, it is also needed a new flood sensor with an efficient real-time operational control mode which results in a long-term autonomy sensor with auto-checking capabilities.

SUMMARY OF THE INVENTION

The object of the invention is a wireless flood sensor to detect the presence of water on home floors, providing early warning of water leaks. A wireless sensor network has been deployed to gather the measurements from the sensor nodes. A central control coordinates the network and processes the data according with the geographical position of the sensor. Users can remotely inquire for the presence of water or other fluid, status of the batteries for a specific node, the type of fluid that is leaked and information about its functionality and alarms. The sensor of the invention is optimized in terms of costs, ease deployment and maintenance, thus making it widely acceptable to end users. The object of the invention is achieved by the sensor of claim 1. Other embodiments of the invention are disclosed in dependent claims.

An advantage of the sensor of the invention is that the sensing electrodes detect the presence of a fluid (usually water) at two heights, so it can discriminate between the presence of accidental water spillage (e.g. dropping of a glass or a bucket of water) and a real food (broken pipe, water inlet from the outside among others). This is a very convenient feature in order to minimize false alarms, as it is disclosed in EP3264384 of the same applicant, which is also incorporated herein by reference.

Power management strategies have increased spectacularly due to the use of handheld portable devices and the intensive research in the area of wireless sensor networks, which usually employ battery-operated devices. In the present invention, a proper choice of low-power hardware components and a customized WSN solution allow to prolong the battery lifetime, extending the autonomy of the system.

It is a further object of the invention a sensor that could be deployed in real environments and for long-term periods by reducing the system complexity, implementing solutions that provide tangible advantages to the everyday life of the end users. This invention discloses an integrated WSN of flood sensors for real-time alerts using the IEEE 802.15.4 wireless technology standard.

Finally, although the target application is in smart homes, the system can also be used for the industry since it can detect the presence of water or other moist fluids in basements, factory floors, laboratories or other locations.

Throughout the description and claims the word "comprises" and variants thereof do not seek to exclude other technical features, accessories, components or steps. For those skilled in the art, other objects, advantages and features of the invention will be deduced in part from the description and in part from putting the invention into practice. The following examples and drawings are provided by way of illustration and do not seek to limit the present invention. Furthermore, the present invention covers all possible combinations of the preferred embodiments indicated herein.

BRIEF DESCRIPTION OF THE DRAWINGS

A series of drawings which help to better understand the invention and are expressly related to an embodiment of said invention presented as a non-limiting example thereof will be very briefly described below.

DETAILED DESCRIPTION OF SPECIFIC EMBODIMENTS

The flood sensor is a device designed to detect fluid leaks (in a non-limitative example water) in domestic or industrial environments. The wireless sensor of the invention (i.e. a sensor node) was developed according to requirements related to size-efficiency, low cost, and low power dissipation. In a preferred embodiment, the wireless sensor is connected to the home (or factory) network and can send an alert to the user, saving costs in water (or other fluid) damage remediation.

Figure 1:
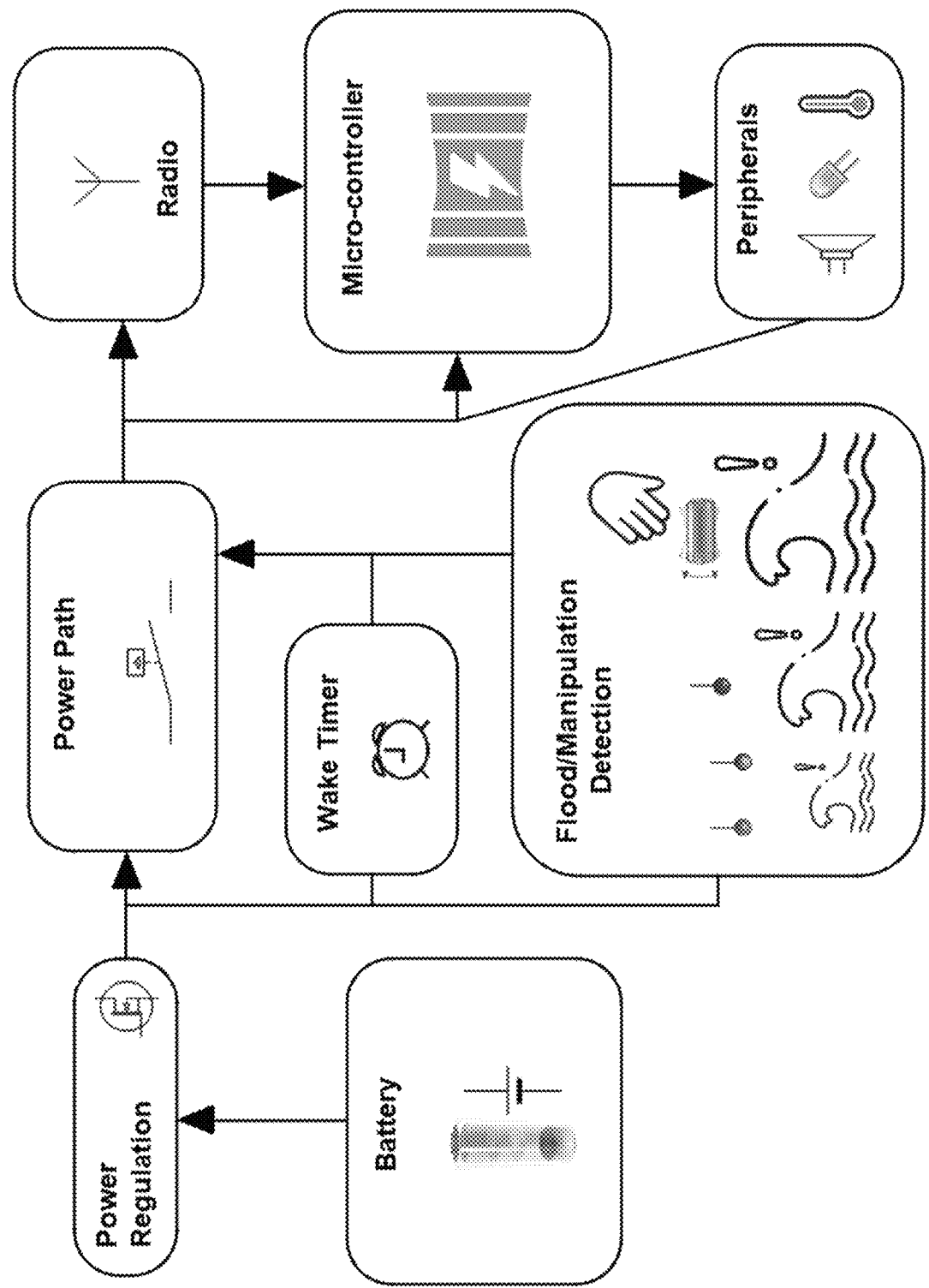
FIG. 1 shows a hardware overview diagram for the flood sensor of the invention.

In a non-limitative embodiment, the deployed WSN is composed of five flood sensor nodes (although it can be easily scaled up and down) and a gateway or central control. In an embodiment, a siren has been also included to provide an audible warning against water presence. The flood sensor detects the accumulation of water on a surface and data is sent through a wireless module, enabling communication with the main system. The sensor nodes can communicate with each other and with the external network via the Internet (TCP/IP protocol) or data mobile networks (e.g. 2G/3G/4G/5G) using the central control. The wireless flood sensor connects to the smart home central control and the user can inquire the device's status by using an electronic portable device such as a mobile phone or a tablet. If the device detects a fluid, the user gets an alert, i.e. usually a text or push notification. Moreover, the wireless flood sensor of the invention can also include a tilt sensor—so the user knows if someone has moved the sensor—, a temperature sensor, a buzzer and a light. In the FIG. 1, it can be found the overview diagram of the invention.

The sensor node includes all circuitry deemed necessary to detect the presence of water at two levels, measure the sensor's tilt, process the data, light signals and send alarms by radio frequency. More concretely, the flood sensor, according with the non-limitative exemplary embodiment of FIG. 1 comprises a battery, a micro-controller for controlling the hardware, performing measurements and electronic detection of water levels; an RF (radio frequency) module; and a buzzer to warn the user about water presence. It also contains a tamper to detect the opening of the device for handling purposes or sabotage. Additionally, the 1 sensor node includes an inclinometer, which enables the system to identify a possible water stream and allows knowing if the device has been relocated or manipulated. For the design of the wireless sensor node, features such as robust radio technology, low cost and low power consumption components, the use of long-lasting energy sources and reduced size have been considered.

In order to increase the lifetime of the battery, the design areas related to power management and stack protocol have been exploited. Energy consumption by node is optimized in such a way that it can be powered solely by batteries. A careful design of the flood sensor has been made in hardware design, wireless communications and firmware, so that with a single battery cell (e.g. CR123 type battery) it achieves an autonomy greater than 10 years.

Figure 2:
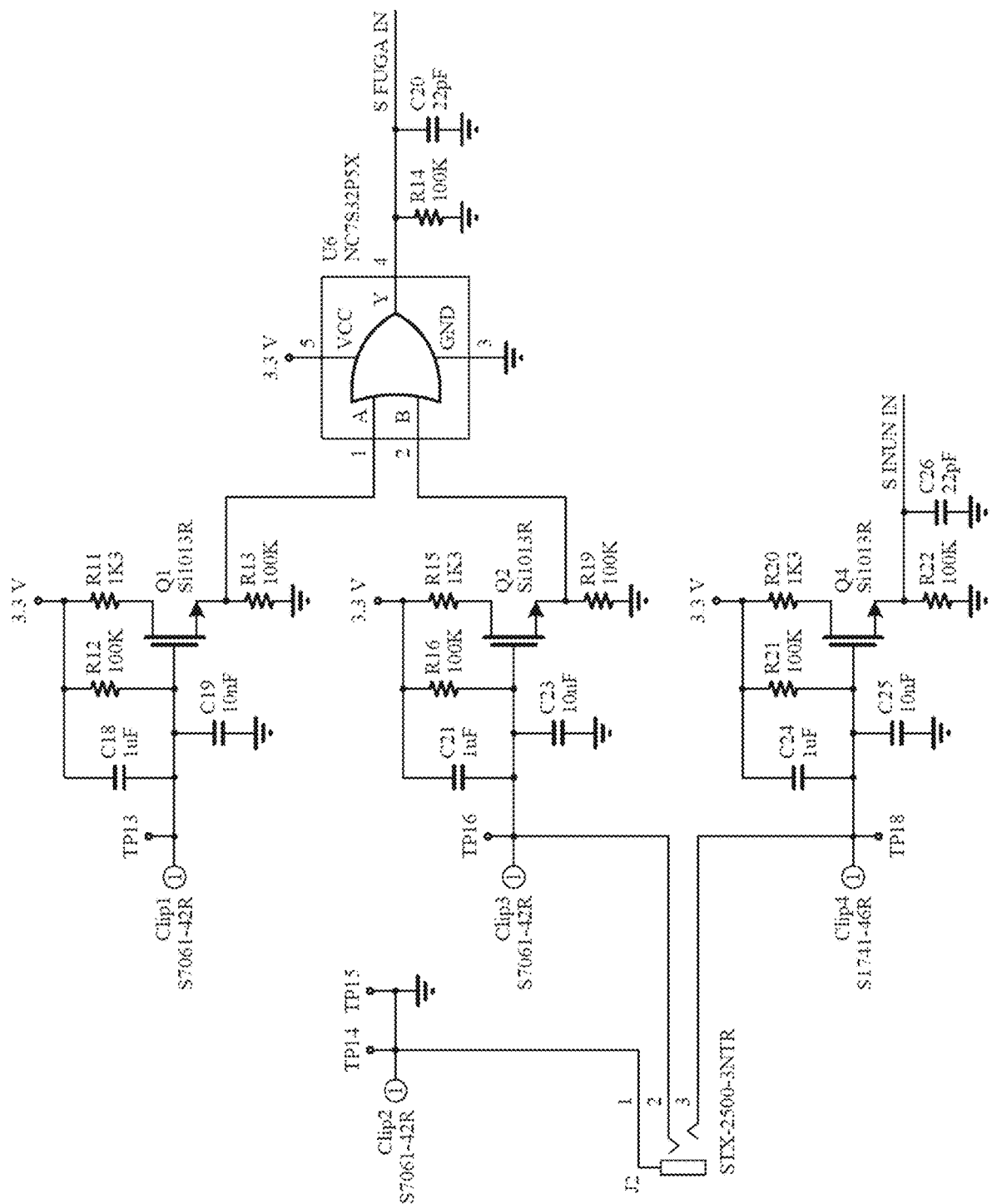
FIG. 2 shows a simplified circuit schematic for the flood sensor of the invention.

Regarding the radio module, it transmits and receives data through a communication standard. The selection of the wireless communication protocol was determined by considering data rate, low power consumption, and cost. The IEEE 802.15.4 standard is the most appropriate to meet the requirements for the target application. It is suitable for applications where the data volume to transfer is low, and it makes possible for network nodes to be powered by battery without recharging for a long period of time. Moreover, this standard presents a high capability of network range expansion by increasing the node quantity. In a non-limitative exemplary implementation, the radio module is based on the MRF89XA transceiver from Microchip, one of the lowest power consumption transceivers available, and exchanges data with the central control node via wireless communication at 868 MHz FIG. 2 shows the circuit schematic for the flood sensor. This circuit is responsible for measuring the two water levels and it is based on a digital circuit that detects the different liquid heights by means of electrodes placed on the bottom of the board. The circuit is designed in such a way that it has a virtually zero static current consumption, having current flow only in the presence of water, thus saving power consumption. If a flood is detected, the output of the circuit is activated, and the microcontroller leaves the zero-power state in which it normally stays.

On the other hand, the tilt sensor can measure inclinations of up to 15 degrees in either direction. As it has been mentioned above, this element is very useful for detecting movement of the sensor, either by a stream of water or flood, or by being manipulated. It is a digital circuit with practically no power consumption, so it does not compromise the autonomy and power consumption specifications pursued by this invention. In a non-limiting exemplary embodiment, the tilt sensor is based on a SQ-SEN-815B capsule from Signal Quest.

The packaging of the flood sensor has electrodes that touch the flat contact surface and that detect the presence of water or other types of liquids. The sensor of the invention can be placed on the floor or on a wall. For the installation on a wall an accessory has been designed which, once fixed to the wall (with adhesive), allows the sensor to be magnetically attached to it.

In a non-limiting exemplary embodiment, the central control performs the data processing and the communications with a remote server and it has been designed with a modular structure. This control unit has different communication modules, both wired and wireless, and six expansion slots for general purpose modules, e.g. sensors, inputs and outputs or communications. The control system is governed by a 32-bit PIC32MZ1024 microprocessor from Microchip, with a clock frequency of up to 140 MHz, and the following characteristics: 80 I/O pins, 32 analog input channels, dedicated hardware for UART, SPI, 120 and USB communication buses, and a real-time clock (RTC). The system supports input voltages between 15 V and 36 V. The power circuit has three main modules for reducing the input voltage to 5 V, which is required to supply some digital circuits, and to obtain a dual supply voltage 167 (±12 V) for the analog circuitry. From the battery voltage, two other voltages are generated: one of 3.3 V to supply all control parts, and a second one of 5 V for powering the communication circuits. The aim is for the central control to never lose connection to the server and be able to send alarms and events even when the mains are disconnected in the event of a power cut. A backup battery of 4500 mAh and 3.7 V was selected in order to provide enough energy to ensure connectivity for 12 hours in case of emergency.

The communications have been designed in a redundant way in order to avoid losing connectivity, and thus, the control incorporates the following types of communications: Ethernet, RS485, USB, WiFi and mobile data. Ethernet, WiFi and mobile data communications are used to establish connectivity to a remote server or the cloud. The order of priority for network use is Ethernet, WiFi and mobile data communications, so that the control central will always first connect via Ethernet. The device attempts to perform the communication by one of the other two ways if loss of connection happens, or if the user settings establish it so.

An expansion slot compatible with some industry standards, such as Xbee and click modules, has been provided for mobile data communications. This fact increases the flexibility of the design since it allows the use of modules of different technologies and frequencies depending on the countries to which the wireless system is intended. Furthermore, for applications where the installation is local, a USB connection is included, so that the device may be connected directly to a PC. Finally, an RS485 type industrial serial communication is provided for other applications where communications between sensors, without a network connection, is needed. This interface can also be used for power supply devices connected in cascade in order to facilitate the installation. Additionally, in any of the expansion slots equipped with SPI and I2C buses, and digital and analog outputs, a communication module type ZigBee, 6LoWPAN, or equivalent can be connected.

All wired connections are designed with galvanic isolation by using insulator integrated circuits, in such a way that communications are isolated from the mains to prevent loss or alteration of messages in case of voltage spikes or unwanted transients.

For further information reinforcement, the control central includes a storage card slot which accepts memories of up to 4 GB. The system detects that the memory is connected, and if so, will create a historical of events which can be collected by extracting the card itself, or through any of the communication interfaces when communication is restored. Each expansion module has a power control circuit which allows for the module to be disabled if necessary, putting the device into an ultra-low power consumption mode and prolonging the autonomy of the internal battery.

In a non-limiting exemplary embodiment, the siren is the device responsible for acoustically warning users of the existence of alarms in the system, as well as to serve as a deterrent to intruders. As the other blocks of the system, the design of the siren seeks power efficiency improvements and size reduction. This device is power supplied externally, but also includes two CR123 batteries to keep it functioning in case of power failure. It can be installed on a tabletop or wall and it has an exemplary dimensions of 88 mm×63 mm.

The circuitry of the siren has been implemented in a single two-layer printed circuit board. It contains the necessary electronics for RF communications, the proper management of the siren (acoustic indication), and an anti-tampering opening mechanism. The entire electronics, which include the same microcontroller and RF module previously described for the sensor node, are placed on the top, and the batteries and power input are place on the bottom of the PCB.

Emerging autonomous low power applications, such as miniaturized wireless sensor nodes, require efficient power management systems. The long-term operation for a wireless system requires the use of proper design strategies both at hardware and software levels. As it has been discussed previously, the hardware elements have been chosen to ensure proper functionality with low power consumption. In addition, the software also incorporates energy saving modes.

On the flood sensor node, ultra-low power consumption is achieved by keeping the microcontroller powered off (with no power supply) most of the time. A discrete hardware timer oversees periodically powering up the microcontroller to send the alive signal. In case of the flood sensor, the hardware is also prepared to instantly power up the microcontroller in the event of water detection. This feature eliminates the need to periodically check the water sensor and permits to extend the power-up interval to tens of minutes or even a few hours.

Figure 3:
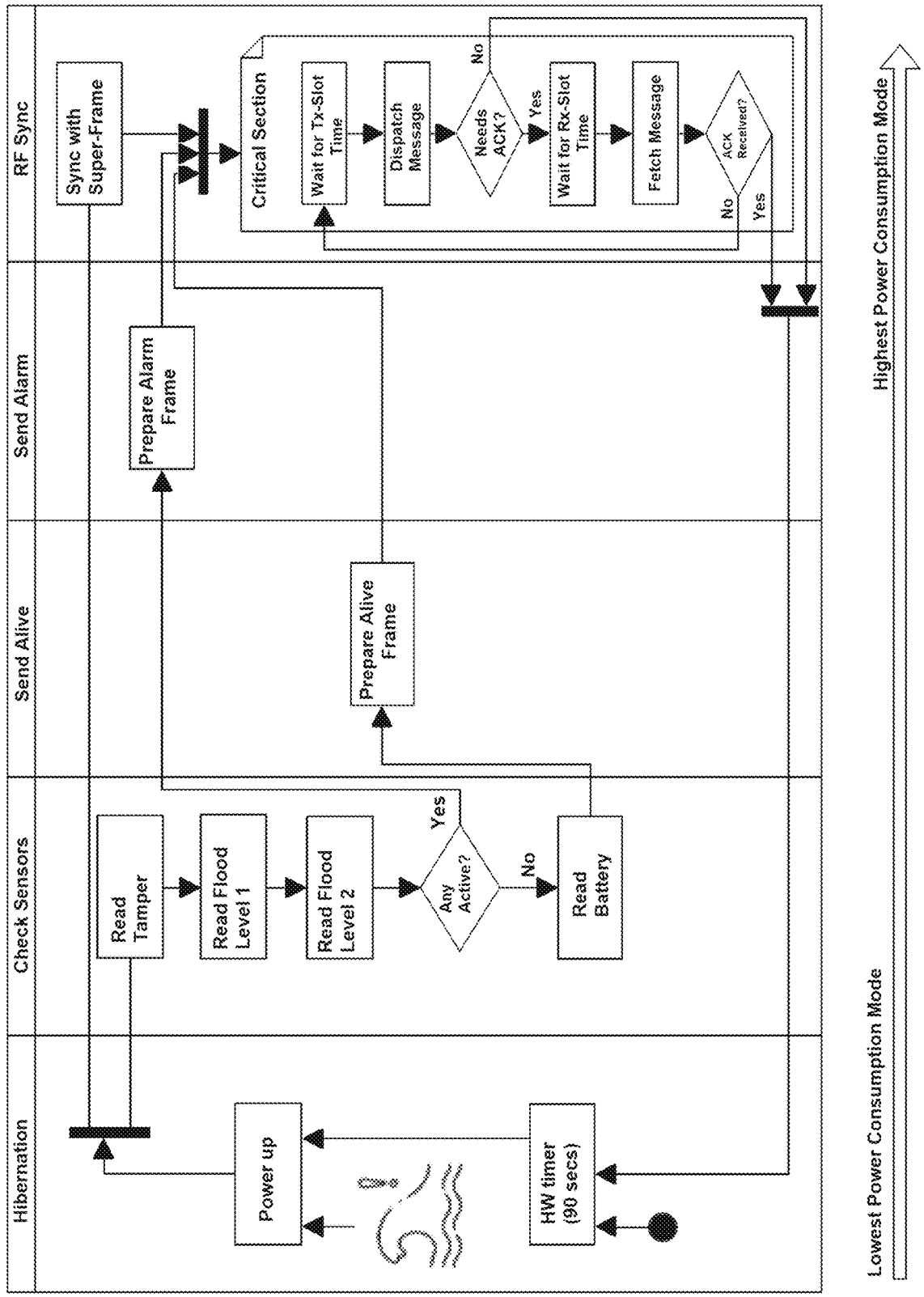
FIG. 3 shows a firmware overview diagram for the flood sensor of the invention.

FIG. 3 shows a high-level view of the finite state machine implemented by the software. Every time the microcontroller is powered, the wake source needs to be analyzed. If no water alarm is found, an alive message is sent to the portal, along with the status information, e.g. battery level, RF signal strength, among others. Once the alive message is acknowledged by the control unit, the microcontroller releases its power supply and returns to its unpowered state.

If a water alarm is found when the wake source is analyzed, the process is very similar to the alive process, with an alarm message being sent instead of an alive message. The likelihood of occurrence of such an event is small, therefore this event can be ignored when estimating battery life time.

It is important to mention that the approach of powering down the system presents some challenges due to the microcontroller losing its RAM retention when powered off. That forces the firmware to store the execution context in the node's nonvolatile memory. In order to reduce cost and failure rate it has been decided to use the internal flash memory of the microcontroller. This type of memory typically supports around 100 Kcycles, which is enough to safely store the execution context at the duty cycle for the expected lifetime of the device.

The control unit uses an external power supply. For this reason, the reduction of its power consumption is much less important than reducing the power consumption of the nodes. An important part of the energy spent on these nodes is associated to communications, and here is where the control unit can bring an important power saving for the associated nodes by using time slot techniques.

The control unit maintains a list of trusted nodes. It schedules the time for each of them to listen and to transmit. The control unit periodically broadcasts a frame to let all nodes know when they should listen or talk, if needed. This mechanism drops the probability of collision to nearly zero, avoiding packet retries and extending node battery life.

Channel hopping techniques have been used along with the time slot approach. The combination of both techniques is known as Time Slot Channel Hopping (TSCH). A TSCH stack not only avoids collision between system nodes but it can also handle strong radio electrical noise blocking one or more channels. The control unit shares channel hopping schemes with its associated nodes. By using and agreed scheme all nodes can predict what channel to use on each slot. Furthermore, the control unit can perform blacklisting of channels in order to maintain bandwidth when some channels are being blocked or are forbidden for any reason.

A small inconvenient of this technique is that the node enrollment becomes more complex. A node cannot talk until it receives permission from a control unit. Therefore, auto-discovery of nodes cannot be done unless a specific slot is put in place for such a purpose. An alternative approach to auto-discovery is to update the list of trusted nodes through other channels. In this case, the user can add nodes to the system through the website, the iOS app or the Android app. Once this is done, a remote server requests to the control unit to register a new node on its list of trusted nodes. From this point on, the control unit assigns slots to the specific node, and so they can communicate.

Once the enrollment process has been complete, the system becomes autonomous, ensuring high readability even if all communications with the remote server are lost.

Figure 4:
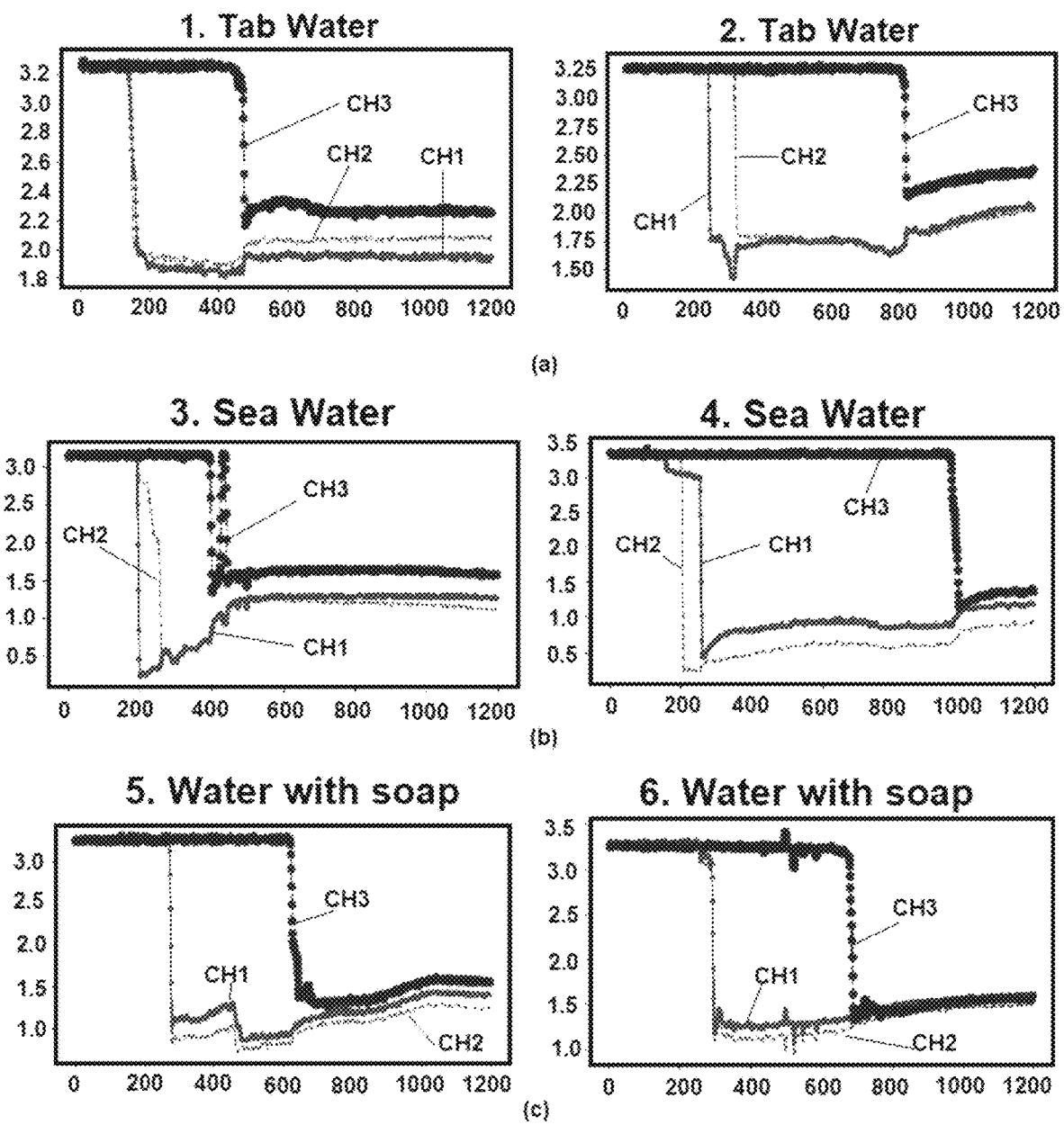
FIG. 4 shows an example of flood detection signals with the flood sensor according to the invention, wherein (a) represents tap water; (b) represents sea water; and (c) represents water with soap.

The sensor has the ability not only to detect water, but to distinguish liquids. FIG. 4 shows some liquid impedance plots. The signal CH3 corresponds to the second flooding level; therefore, it becomes excited latter on in all plots. The CH1 signal and CH2 signal are the two electrodes at floor level. As it can be appreciated in the above plots, there are differences in the characteristic impedance of the liquids and the trends they generate during the first seconds after an activation. In case of an alarm, the value of all electrodes is sampled and sent to the cloud, where it is combined and process accordingly by one server to estimate the nature of the liquid, according with the detected impedance and the geographical localization of the sensor, i.e. if a sensor detects a liquid with the impedance value X and the sensor is placed near the sea, the server would estimate that the liquid could be sea water.

The wireless system has been developed so that it can include other measurable variables inside the home, so all home systems are integrated into a centralized control unit, accessible from different wireless mobile devices, such as smartphones or tablets. Thus, the control central interacts with the end user through a web server for real-time data display, while an iOS or Android application is running on mobile terminals.

A low power flood detection system for wireless sensor networks has been presented. The designed sensor allows end users to more easily monitor home devices locally and remotely and it can alert the user in case of home accidents. The sensor has the ability not only to detect water but to distinguish liquids. A wireless sensor network has been deployed, where flood sensing nodes, actuator nodes and a control central have been developed. For each node, hardware and software components have been described in detail. Communication between the sensor network and the control central has been successfully implemented using the IEEE 802.15.4 standard. A graphical user interface for mobile applications allows remote access and real-time control and monitoring of several performance parameters. The result is a low cost, highly reliable and easily scalable infrastructure with application to smart homes. The invention also enables the possibility to machine learning algorithms expanding the number of liquids that could be distinguished thanks to the combination with the geographical position of the sensor, increasing the identification success rate, and it may even bring new features to the product, like home appliance preventive maintenance, by digging down activity patterns.

Where appropriate, several embodiments provided in this disclosure can be implemented using hardware, software, or combinations of hardware and software. Also, where appropriate, the various hardware components and/or software components established in this document can be combined in composite components comprising software, hardware, and/or both, without departing from the object of the present invention defined in the claims. Where appropriate, the various hardware components and/or software components established herein can be separated into sub-components comprising software, hardware, or both, without departing from the object of the present invention defined in the claims. Furthermore, where appropriate, it is contemplated that the software components can be implemented as hardware components, and vice versa.

The software according to the present description, such as non-transitory instructions, data and/or program code, can be stored in one or more non-transitory machine-readable media. It is also contemplated that the software identified herein can be implemented using one or more general-purpose or specific-purpose networking computers and/or computing systems, and/or of another type. Where appropriate, the order of the various steps described herein can be changed and/or split into sub-steps to provide the features described herein.

The embodiments described above illustrate but do not limit the invention. It must also be understood that several modifications and variations are possible according to the object of the present invention. Accordingly, the scope of the invention is defined only by the following claims.

The invention claimed is:

1. An automation system for detecting a flood comprising at least one flood sensor; a central control connected with the at least one flood sensor; and a remote server connected with the central control;
    wherein the at least one flood sensor comprises:
        at least two electrodes connected with a measuring circuit arranged to detect a plurality of liquid levels, wherein the measuring circuit has a virtually zero static current consumption, having current flow only in the presence of fluid; and if a liquid is detected, an output of the measuring circuit is activated, and a microcontroller leaves a zero-power state in which it normally stays; and
        wherein the microcontroller comprises a program or programs stored in a memory and configured for being run by means of the microcontroller, wherein said program or programs comprise instructions for: (a) measuring an impedance of the liquid that has activated the output of the measuring circuit; and (b) sending a measured impedance to a remote server through a central control; and
    wherein the remote server is arranged to receive the impedance of the fluid detected by the at least one flood sensor and to estimate a nature of the liquid based on the measured impedance and a geographical localization of the at least one flood sensor.

2. The automation system of claim 1, used in a smart home automation system.

3. The automation system of the claim 1, used in an automation factory system.

4. The automation system of claim 1, wherein the at least one flood sensor comprises a radio module arranged to send the measured impedance to the central control.

5. An automation method for detecting a flood comprising the steps of:
    detecting a plurality of liquid levels with at least two electrodes connected with a measuring circuit with a virtually zero static current consumption, having current flow only in the presence of fluid; and if a liquid is detected, an output of the measuring circuit is activated, and a microcontroller leaves a zero-power state in which it normally stays; and measuring an impedance of the liquid that has activated the output of the measuring circuit;

sending the impedance measured in the liquid that has activated the output of the measuring circuit to a remote server through a central control; and estimating a nature of the liquid based on the measured impedance and a geographical localization of the detected liquid.

6. The automation method of claim 5, wherein the measured impedance is sent to the central control through a radio module.

* * * * *